United States Patent
Huston et al.

(10) Patent No.: US 10,739,870 B2
(45) Date of Patent: Aug. 11, 2020

(54) STYLUS FOR COORDINATE MEASURING

(71) Applicant: Apple Inc., Cupertino, CA (US)

(72) Inventors: Collin A. Huston, Sunnyvale, CA (US); Joel N. Ruscher, Fremont, CA (US); Kevin C. Armendariz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/670,997

(22) Filed: Aug. 7, 2017

(65) Prior Publication Data
US 2018/0081455 A1    Mar. 22, 2018

Related U.S. Application Data

(60) Provisional application No. 62/397,529, filed on Sep. 21, 2016.

(51) Int. Cl.
| | | |
|---|---|---|
| *G06F 3/0354* | (2013.01) | |
| *G06F 3/041* | (2006.01) | |
| *G06F 3/0488* | (2013.01) | |
| *G06F 3/01* | (2006.01) | |
| *G06F 3/0346* | (2013.01) | |
| *G06F 3/0484* | (2013.01) | |
| *G06F 3/038* | (2013.01) | |

(52) U.S. Cl.
CPC .......... *G06F 3/03545* (2013.01); *G06F 3/017* (2013.01); *G06F 3/0346* (2013.01); *G06F 3/0383* (2013.01); *G06F 3/0416* (2013.01); *G06F 3/04845* (2013.01); *G06F 3/04883* (2013.01)

(58) Field of Classification Search
CPC ............. G06F 3/03545; G06F 3/04883; G06F 3/0416; G06F 3/017; G06F 3/04845; G06F 3/0346; G06F 3/0383
See application file for complete search history.

(56) References Cited

U.S. PATENT DOCUMENTS

| | | | |
|---|---|---|---|
| 6,188,392 B1 | 2/2001 | O'Connor et al. | |
| 6,882,953 B2 | 4/2005 | D'Hooge et al. | |
| 8,116,559 B2 | 2/2012 | Knighton et al. | |
| 2003/0028347 A1* | 2/2003 | D'Hooge ............ | G01B 11/002 702/152 |
| 2015/0130758 A1* | 5/2015 | Chang .................. | G06F 3/0418 345/174 |
| 2015/0212602 A1* | 7/2015 | Lor ..................... | G06F 3/03545 345/175 |

FOREIGN PATENT DOCUMENTS

CN       105068680 A      11/2015

OTHER PUBLICATIONS

Milosevic et al., "A SmartPen for 3D Interaction and Sketch-Based Surface Modeling," Int. J. Adv. Manuf. Technol., Sep. 2015, 21 pages.

\* cited by examiner

*Primary Examiner* — Yaron Cohen
(74) *Attorney, Agent, or Firm* — Morgan, Lewis & Bockius LLP (57) ABSTRACT

An input device, such as a hand-held, wireless stylus, can be used to measure coordinates of a three-dimensional object. Position data can be calculated based on, for example, acceleration, orientation, and static parameters of a stylus. As the stylus contacts contours of the object, the position data of the stylus can allow mapping of the object as well as digital rendering thereof. The stylus can also be used to virtually create three-dimensional illustrations.

18 Claims, 4 Drawing Sheets

*FIG. 8*

STYLUS FOR COORDINATE MEASURING

CROSS-REFERENCE TO RELATED APPLICATION(S)

This application claims the benefit of U.S. Provisional Application No. 62/397,529, entitled "STYLUS FOR COORDINATE MEASURING," filed Sep. 21, 2016, the entirety of which is incorporated herein by reference.

FIELD

The described embodiments relate generally to hand-held, wireless coordinate measuring devices. More particularly, the present embodiments relate to styluses used for coordinate measuring.

BACKGROUND

Coordinate measuring machines are used for measuring objects or for marking and laying out patterns on a workpiece. These machines provide for movement of a probe in any one of three mutually perpendicular coordinate directions (x, y, and z axes). In some coordinate measuring machines, a measuring probe is brought into contact with a workpiece on a surface plate, and the coordinates at each point of contact are recorded.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some coordinate measuring machines that are used to map an object in space require dedicated components for measuring movement and location of a probe. For example, a typical coordinate measuring machine provides movement of the probe along rails that extend in each of three axes that are orthogonal to each other in a three-dimensional (x, y, and z) coordinate system. The machine tracks movement of the probe along each of the rails. When the probe contacts the object, the machine records the x, y, and z coordinates to determine position in the coordinate system. The mechanisms for providing motion are integrated with the mechanisms for measuring the motion. Other systems use external tracking mechanisms, such as optical position detection, to determine the position of a probe with respect to an external detection device. These machines require robust tracking equipment apart from the probe to determine the position of the probe.

In accordance with embodiments disclosed herein, hand-held, wireless input devices, such as styluses, can provide accurate coordinate measurement without being mechanically attached or optically visible to external tracking equipment. Instead, all or substantially all of the components for measuring and recording coordinates of an object can be entirely contained within a hand-held, wireless stylus. For example, position data can be calculated based on acceleration, orientation, and static parameters of a stylus. As the stylus contacts contours of an object, the position data of the stylus can allow mapping of the object as well as digital rendering thereof. The stylus can also be used to virtually create three-dimensional illustrations. The stylus can be provided in a compact form to allow easy handling by a user. The same stylus can also be used for other general purposes, such as providing input to an external device with a touchscreen.

Figure 1:
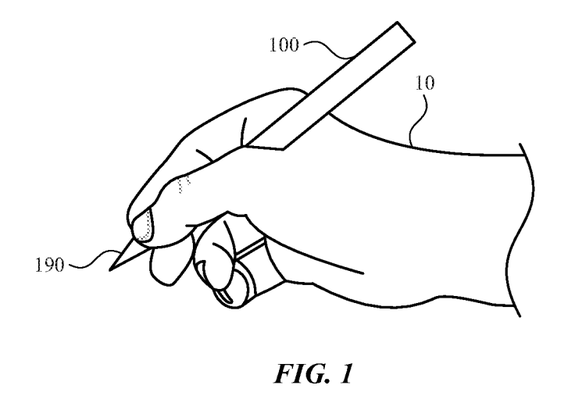
FIG. 1 illustrates a view of a stylus in use by a user, according to some embodiments of the subject technology.

An input device in accordance with embodiments disclosed herein can include any device that is held, worn, or contacted by a user for receiving inputs from the user and providing outputs to another device. The touch-based input device can be used alone or in conjunction with another device. FIG. 1 illustrates a stylus 100, according to some embodiments of the subject technology. The stylus 100 can be held by a user 10 during operation. The stylus 100 can be used to detect objects and measure the location of contact with the object in a three-dimensional coordinate system.

Figure 2:
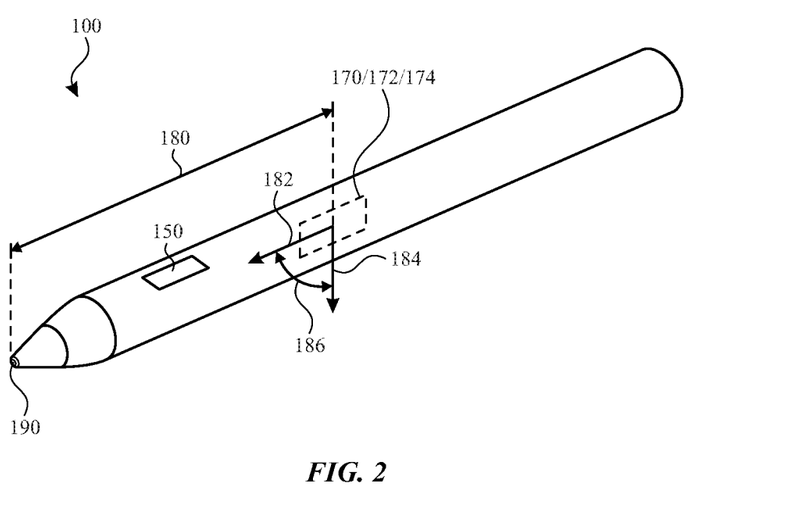
FIG. 2 illustrates a perspective view of the stylus of FIG. 1, according to some embodiments of the subject technology.

The stylus 100 can detect when a portion thereof is contacting an object. FIG. 2 illustrates the stylus 100, according to some embodiments of the subject technology. According to some embodiments, a tip probe 190 of the stylus 100 can include one or more sensors that detect when the tip probe 190 contacts a surface of an object. Such sensors can include one or more contact sensors, capacitive sensors, touch sensors, cameras, piezoelectric sensors, pressure sensors, photodiodes, and/or other sensors operable to detect contact with the object. The tip probe 190 can record or wirelessly transmit a signal when contact is detected.

When contact with an object is detected (e.g., with the tip probe 190), the location of contact can be measured by the stylus 100 without being mechanically attached to external measuring equipment or relying on external devices for reference. According to some embodiments, the stylus 100 can include an accelerometer 170, a gyroscope 172, and/or a compass 174. During use, the accelerometer 170 can track and record acceleration of the stylus 100. Acceleration can be measured in a three-dimensional (x, y, and z) coordinate system. For example, the accelerometer 170 can have at least three components that each measure acceleration in one of three mutually orthogonal axes. By combining the measurements of all components, acceleration in the three-dimensional coordinate system can be determined. The accelerometer 170 can be configured to measure and record acceleration at several points in time during a sampling period. For example, the measurements can be taken at regular intervals of time. Other components of the stylus 100, such as the gyroscope 172 and/or the compass 174, can be used to measure acceleration of the stylus 100. The location of the tip probe 190 can be calculated based, at least in part, on the acceleration measurements, as discussed further herein. The stylus 100 can also include other components, such as a GPS receiver, that can be used to measure or calculate the position, velocity, and/or acceleration of the stylus 100.

The stylus 100 can detect its orientation in the coordinate system during use to help determine the location of the tip probe 190 of the stylus 100 relative to other components of the stylus 100. For example, the components for measuring motion of the stylus 100 can be located a distance away from the components that contact the object. As such, the stylus 100 can compensate for this offset when determining the location of the contact. According to some embodiments, for example as shown in FIG. 2, the accelerometer 170, the gyroscope 172, and/or the compass 174 may be located an offset distance 180 away from the tip probe 190. Measurement and calculation of the position of the tip probe 190 can contemplate the offset distance 180 and the offset direction 182 from certain components (e.g., the accelerometer 170, the gyroscope 172, and/or the compass 174) to the tip probe 190. The tip probe 190 and other components of the stylus 100 can be fixed within the stylus 100, such that the distance between any two of these components remains fixed during use of the stylus 100. As such, the offset distance 180 can be known and remain constant. The offset direction 182 can form an offset angle 186 with respect to a gravitational direction 184, which can be defined as the direction of gravitational pull. Components of the stylus 100, such as the gyroscope 172, can measure and record the gravitational direction 184, which can define the coordinate system with respect to the stylus 100. For example, the gravitational direction 184 can define a z-axis in the external coordinate system. Accordingly, the offset distance 180 is known and the offset direction 182 can be determined with respect to the coordinate system to determine the location of the tip probe 190 relative to the accelerometer 170, the gyroscope 172, and/or the compass 174.

As shown, all of the components for measuring and recording coordinates of an object can be entirely contained within the stylus 100. Neither mechanical attachment to external measuring equipment nor communication with external devices is required to track the motion of the stylus 100 in space. As such, the stylus 100 can be hand-held, wireless, and freely moveable by the user during a measuring session.

Components of the stylus 100 can be configured to receive input directly from the user to indicate when measurements are to be taken. For example, the stylus 100 can include an input component such as a button 150 set within a main body of the stylus 100. The button 150 can include a switch, knob, lever, force sensor, and/or another input component. Any number of buttons 150 can be provided for receiving user input. The user can operate the button 150 to initiate a sampling session, terminate a sampling session, indicate contact with a reference point, take a measurement, or command the stylus 100 to perform other functions, as discussed further herein.

Figure 3:
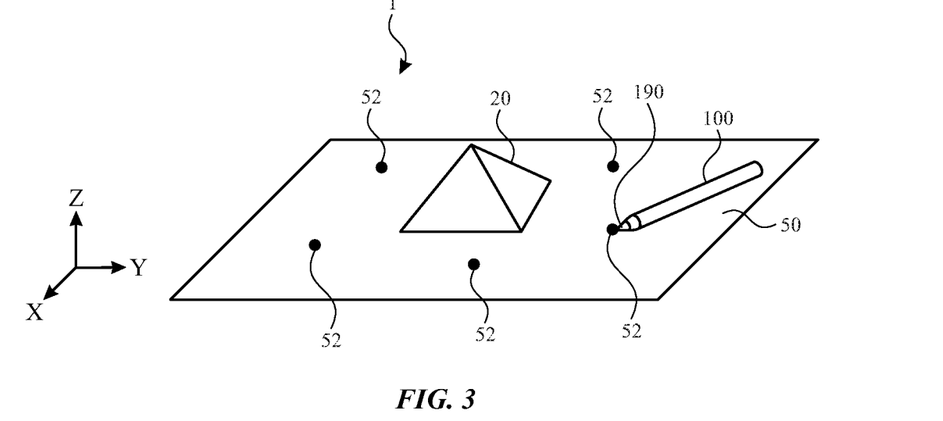
FIG. 3 illustrates a perspective view of a system including a stylus for measuring coordinates of a surface supporting an object, according to some embodiments of the subject technology.

The stylus 100 can be used to determine an aspect of the coordinate system. By determining an aspect of the coordinate system, subsequent measurements of the stylus 100 can be recorded with respect to the coordinate system to yield a mapping of the object within the coordinate system. FIG. 3 illustrates a perspective view of a system 1 including the stylus 100, according to some embodiments of the subject technology. According to some embodiments, a surface 50 is provided, and the object 20 is placed on the surface 50. The surface 50 can be fixed in space, so that it provides one or more fixed reference points in the coordinate system. The surface 50 can be substantially planar, such that it can define two axes of the coordinate system. For example, as shown in FIG. 3, both the x-axis and the y-axis can lie within the plane of the surface 50. This plane can be defined as the x-y plane. To determine the arrangement of the coordinate system with respect to the surface 50 and/or the object 20, multiple surface points 52 along the surface 50 can be measured with the stylus 100. For example, 3, 4, 5, 6, 7, 8, 9, or more than 9 surface points 52 can be measured with the stylus 100. Where the surface 50 includes a digital display and/or interface, the surface 50 can display the surface points 52 and aid in detection of contact between the tip probe 190 and the surface points 52. The coordinate system can be constructed such that, for each measurement, the x-axis and y-axis coordinates can vary, and the z-axis coordinates can be the same or substantially the same. According to some embodiments, a bottom portion of the object 20 can rest upon the surface 50 (e.g., in the x-y plane) and have a portion thereof with a z-axis coordinate value that is equal to that of the surface points 52. Accordingly, measurements of the object 20 can yield topographical information that includes the altitude of a point on the object that is a distance along the z-axis away from the surface 50 (e.g., the x-y plane).

Figure 4:
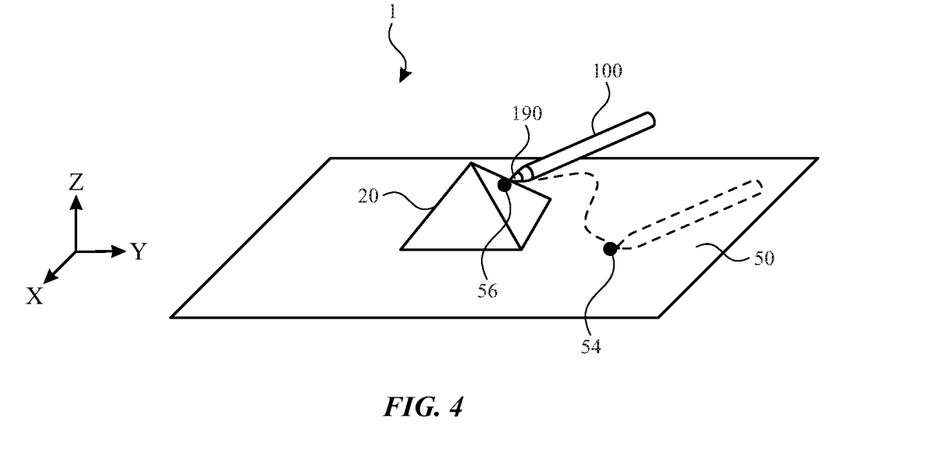
FIG. 4 illustrates a perspective view of the system of FIG. 3, including the stylus for measuring coordinates of the object on the surface, according to some embodiments of the subject technology.

When the coordinate system has been defined, the stylus 100 can be used to measure the object 20 with respect to the coordinate system. According to some embodiments, each measurement of the stylus 100 is based on motion of the stylus 100. The tip probe 190 of the stylus 100 can begin a sampling session at a reference point 54. The reference point 54 can have a known position for calibrating the stylus 100. For example, the reference point 54 can be at a location within the x-y plane of the surface 50. A visible marker can be provided for indicating to a user to location of the reference point 54. Alternatively or in combination, the reference point 54 can be outside the x-y plane. Alternatively or in combination, the reference point 54 can be a point on a surface of the object 20. Where the surface 50 includes a digital display and/or interface, the surface 50 can display the reference point 54 and aid in detection of contact between the tip probe 190 and the reference point 54. The user can indicate that the tip probe 190 of the stylus 100 is located at the reference point 54, for example by pressing and/or holding the button 150. After a sampling session has been initiated, the user can move the stylus 100 to a sample point 56 on a surface of the object 20. The stylus 100 can measure and record one or more measurements during travel from the reference point 54 to the sample point 56. For example, acceleration, orientation, and/or any other aspect of the stylus 100 with respect to the coordinate system can be measured and recorded. The measurements can include those taken at the reference point 54 and/or the sample point 56. The user can press the tip probe 190 of the stylus 100 against the surface of the object 20 at the sample point 56. The tip probe 190 can generate a signal to indicate detection of the surface of the object 20. Measurement of the location of the sample point 56 can be taken, as discussed further herein.

According to some embodiments, a sampling session can include additional operations in which the tip probe 190 is brought into contact with additional sample points 56 on the surface of the object 20. With each contact detected by the tip probe 190, the tip probe 190 can generate a signal to indicate detection of the surface of the object 20. The travel-related measurements between sample points 56 can be measured and recorded continuously or intermittently. The measurements can be made with respect to the reference point 54 and/or with respect to a preceding sample point 56. According to some embodiments, the user returns the tip probe 190 to the reference point 54 after each contact with a sample point 56, with the user providing inputs (e.g., with the button 150) indicating that tip probe 190 is located at the reference point 54. With each return to the same reference point 54, the stylus 100 is able to recalibrate its position within the coordinate system. The user can maintain the stylus at the reference point 54 with zero or substantially zero velocity and with zero or substantially zero acceleration for a time while providing inputs (e.g., with the button 150) indicating that tip probe 190 is at rest. This action allows the stylus 100 to calibrate the position, velocity, and acceleration measurements and/or calculations.

According to some embodiments, a number of the sample points 56 can be measured as the tip probe 190 is pressed against a surface and the stylus 100 moves along the surface. For example, the user can press the tip probe 190 against a surface of the object 20 and move the tip probe 190 to different parts of the surface. While the tip probe 190 remains pressed against the surface of the object 20, the stylus 100 can continue to measure the locations of contact continuously or intermittently. As such, curves and contours of the object 20 can be measured in rapid succession by maintaining contact of the tip probe 190 with the object 20.

According to some embodiments, a number of the sample points 56 can be measured along a perimeter of the object 20 that abuts the surface 50. For example, the tip probe 190 of the stylus 100 can trace a bottom portion of the object 20 that rests on the surface 50. Where the surface 50 includes a digital display and/or interface, the surface 50 can also include components that aid in detection of contact between the tip probe 190 and the surface 50. Based on the measurements from such a sampling session, a boundary of the object 20 can be calculated. Additional measurements on portions of the object within this boundary can include z-axis coordinates, such that the object 20 is characterized by its topography at each of a variety of x- and y-coordinates that are within the boundary.

According to some embodiments, measurements taken by the stylus 100 can be recorded with respect to the tip probe 190 or with enough parameters to calculate activity of the tip probe 190. For example, each measurement taken by the stylus 100 at a point in time can include an acceleration (e.g., in each of the x-, y-, and z-axes), the offset distance 180 (e.g., stored as a known constant), the offset direction 182, the gravitational direction 184, and/or the offset angle 186.

According to some embodiments, the location of the tip probe 190 can be calculated for each point in time during a sampling session. Alternatively or in combination, the location of the tip probe 190 can be calculated for points in time when the tip probe 190 is in contact with an object (e.g., at the surface point 52, a reference point 54, and/or a sample point 56), but not for points in time when the tip probe 190 is not in contact with an object. For these latter points in time, the acceleration data can be recorded to track motion of the stylus 100.

Figure 5:
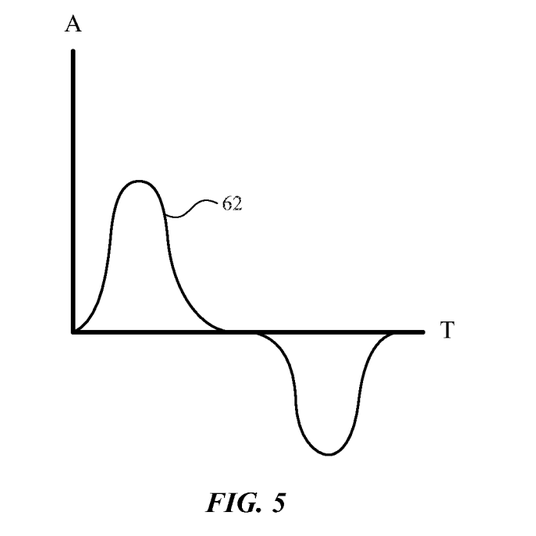
FIG. 5 illustrates a graph of acceleration data over a sample time period, according to some embodiments of the subject technology.
Figure 6:
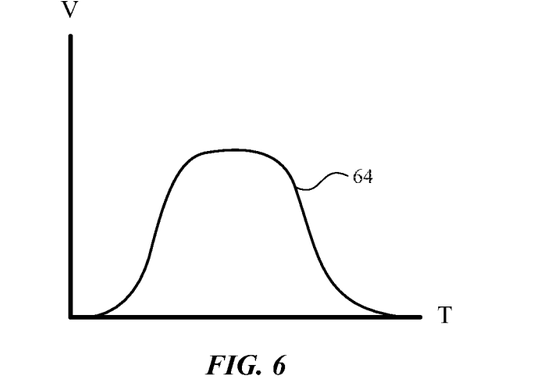
FIG. 6 illustrates a graph of velocity data over the sample time period based on the acceleration data of FIG. 5, according to some embodiments of the subject technology.
Figure 7:
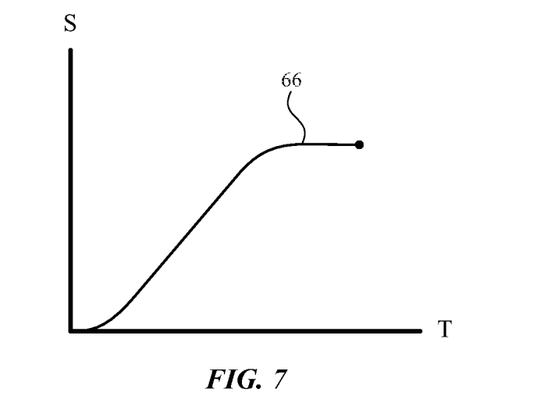
FIG. 7 illustrates a graph of position data over the sample time period based on the acceleration data of FIG. 5 and/or the velocity data of FIG. 6, according to some embodiments of the subject technology.

The measurements taken by the stylus 100 can be used to calculate the position of the tip probe 190. FIG. 5 illustrates a graph of acceleration ("a") data 62 over a sample time ("t") period, according to some embodiments of the subject technology. FIG. 6 illustrates a graph of velocity ("v") data 64 over the sample time ("t") period based on the acceleration data of FIG. 5, according to some embodiments of the subject technology. FIG. 7 illustrates a graph of position ("s") data 66 over the sample time ("t") period based on the acceleration data of FIG. 5 and/or the velocity data of FIG. 6, according to some embodiments of the subject technology. While each type of data is illustrated herein as plots on a graph, it will be understood that the stylus 100 can record the data in a similar or different manner, for example without plotting a graph. Data can be measured and recorded in each of three (e.g., x, y, and z) mutually orthogonal axes. A separate data set can be used for each axis, with the collection of all data sets providing information sufficient to identify a location in the three-dimensional coordinate system.

According to some embodiments, the acceleration data 62 taken over a sample time period can represent direct measurements taken by the stylus 100. The acceleration measurements can be correlated with the corresponding time at which the measurement was taken. From the acceleration data, the stylus 100 or another device can calculate and/or estimate the velocity of the stylus 100 at various points during the sample time period. Likewise, from the acceleration data 62 and/or the velocity data, the stylus 100 or another device can calculate and/or estimate the position of the stylus 100 at various points during the sample time period. The velocity data 64 and/or position data 66 can be calculated and/or estimated by one or more techniques, such as graph-based plotting (e.g., approximating area of a region bounded by a graph), curve fitting, integral calculation, calculating limits of Riemann sums, and/or combinations thereof. Estimation of velocity and/or position can contemplate data recorded from a reference time when the tip probe 190 was at the reference point 54, where the position (e.g., at the reference point 54), velocity (e.g., zero), and acceleration (e.g., zero) were known independently of measurements taken by the stylus 100. For example, a velocity for each sample time can be estimated based on acceleration data 62 between the reference time and the sample time. Likewise, a position for each sample time can be estimated based on velocity data 64 between the reference time and the sample time.

Based on the calculated position data, the object 20 can be rendered virtually in three-dimensional space. For example, the position of each point that corresponds to a portion of the object 20 can be displayed and/or rendered to virtually illustrate at least a portion of the object 20. The object 20 can be rendered as a model with continuous surfaces by estimating the surfaces between nearby points. For example, each point can represent a vertex, with multiple vertices connected by line segments to form a polygon mesh. By further example, surfaces of a model can be defined by curves that follow the calculated points. Other three-dimensional modeling techniques can be applied. The resulting model can be modified and/or refined by a user. According to some embodiments, the user can provide an indication to a device that a particular set of points corresponds to a shape (e.g., line, circle, polygon, etc.). With this indication, the device can apply a rendering technique to estimate the shape according to the points provided. For example, where three recorded points correspond to a full circle of the object 20, a device can virtually plot the entire circumference of the circle based on the three or more separate points measured along the circle of the object 20.

The stylus 100 can be used to virtually draw in three-dimensional space. Illustrations can be created in free space by motion of the stylus 100 by the user. One or more aspects of calibration and motion tracking as discussed above for the stylus 100 can be applied to track free motion during a drawing session. The user can operate the button 150 to initiate a drawing session, in which a marking is virtually created starting at the location of the tip probe 190 in the coordinate system. As the user moves the stylus 100 and continues the drawing session, markings continue to be generated along the pathway of the tip probe 190. When the user provides an indication (e.g., by releasing or pressing the button 150) to cease the drawing session, the marking ceases to be generated, and the user can move the stylus 100 without generating additional markings. The recording of markings can be performed independently of whether the tip probe 190 makes contact with a surface. According to some embodiments, the stylus 100 can record motions by the user during a drawing session and transmit the applicable data for later display. According to some embodiments, the stylus 100 can communicate with a device for visual display to the user, with which the markings are displayed for the user as they are generated during a drawing session. For example, the display can include a virtual reality headset in communication with the stylus 100 (e.g., directly or via an intervening device). By further example, the display can include a flat-panel display that displays a three-dimensional rendering of the markings.

During or between drawings sessions, the button 150 of the stylus 100 or another input device can be used to change how the markings are generated. While the stylus 100 is used for drawing or writing, the positions of the tip probe 190 can be recorded as markings, lines, or shapes having a variety of characteristics. For example, the recorded markings can have a certain shape, thickness, and color. When the user operates the button 150 or another input device, the stylus 100 or another device can interpret the signal as a command to apply one or more characteristics to markings generated by subsequent input from the stylus. Accordingly, subsequent markings can be recorded as having the one or more characteristics determined by the input signal.

According to some embodiments, a drawing session can be used to modify or edit a model generated based on operation of the stylus 100 with an object. For example, a user can measure an object, command the object to be rendered and displayed, and then further operate the stylus 100 to change aspects of the rendered and displayed model.

The stylus 100 can be used to map motions in three-dimensional space for use in various other applications. According to some embodiments, the motion of the stylus 100 by the user can be used by a gaming application that uses motion as an input. According to some embodiments, the motion of the stylus 100 by the user can be used to detect user gestures that indicate user commands to an external device for performing a particular action. According to some embodiments, the motion of the stylus 100 by the user can be used to detect a selection by the user of an object that is displayed to the user in a virtual three-dimensional environment.

As discussed above with respect to coordinate measuring, all of the components for tracking motion of the stylus 100 during a drawing session can be entirely contained within the stylus 100. Neither mechanical attachment to external measuring equipment nor communication with external devices is required to track the motion of the stylus 100 in space. As such, the stylus 100 can be hand-held, wireless, and freely moveable by the user during a drawing session.

Figure 8:
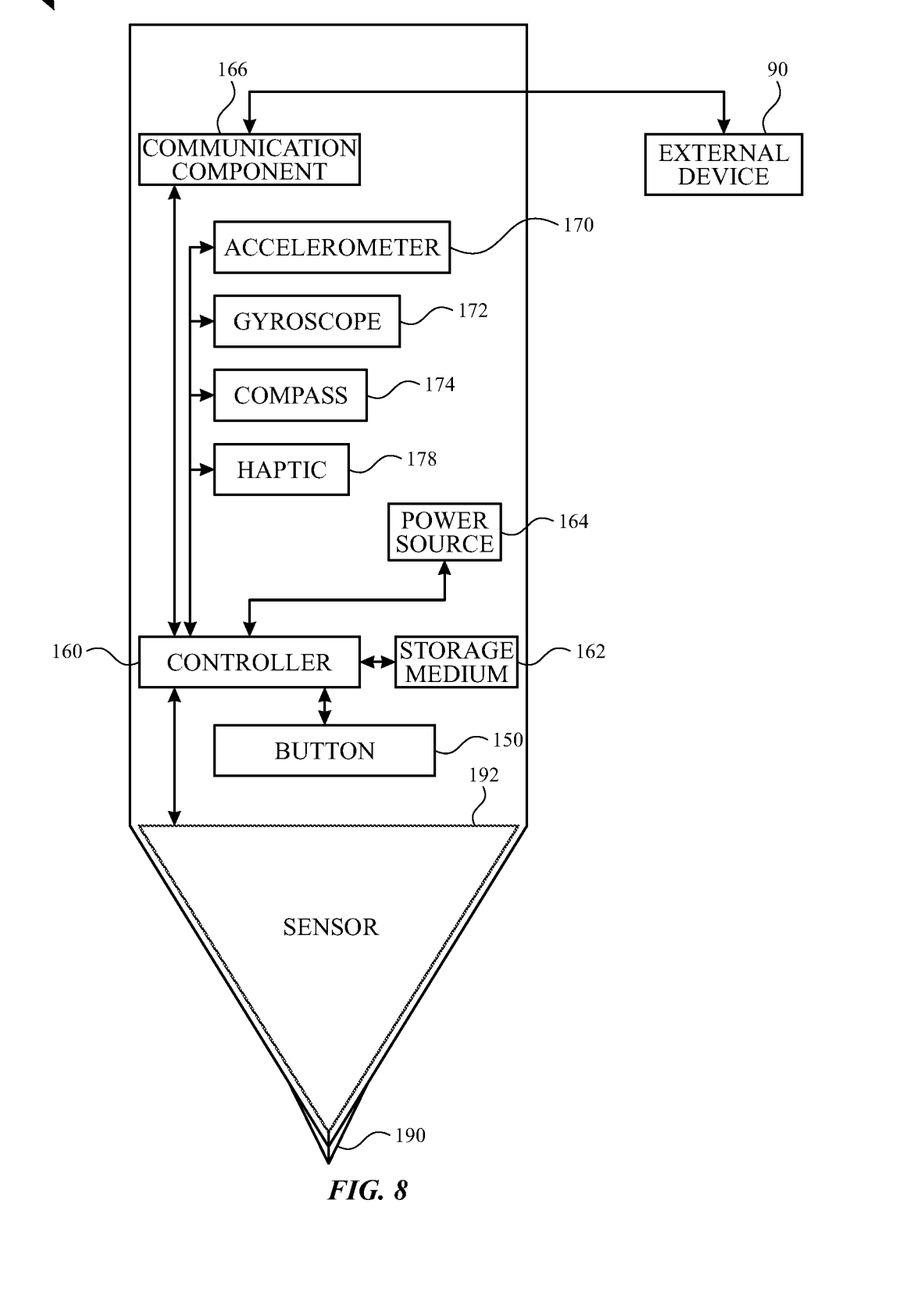
FIG. 8 illustrates a block diagram illustrating the stylus of FIG. 1, according to some embodiments of the subject technology.

The stylus 100 can be provided with components that facilitate the operation thereof. FIG. 8 illustrates various components of the stylus 100, according to some embodiments of the subject technology.

According to some embodiments, the stylus 100 can include a probe sensor 192 at a tip probe 190 of the stylus 100 for sensing when the tip probe 190 is contacting a surface, such as the surface 50 or the object 20. The probe sensor 192 can include one or more contact sensors, capacitive sensors, touch sensors, cameras, piezoelectric sensors, pressure sensors, photodiodes, and/or other sensors. The probe sensor 192 can include a capability to sense distortions on the surface 50, such as by detecting varying forces with a force sensor. Distortion data can be collected to be included in topographical information regarding surface features of an object being measured by the stylus 100.

According to some embodiments, the stylus 100 can include a controller 106 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 106 can execute one or more instructions stored in the non-transitory storage medium 162 to perform one or more functions. For example, the non-transitory storage medium 162 can store one or more haptic profiles that the touch implement may utilize to simulate one or more textures. In some cases, the stylus 100 may retrieve a specific haptic profile utilizing one or more references and/or other codes detected from a surface utilizing the probe sensor 192 and/or received from an electronic device associated with the surface.

According to some embodiments, the stylus 100 can include a communication component 166 for communicating with an external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

According to some embodiments, the stylus 100 can include a power source 164, such as one or more batteries and/or power management units. The stylus 100 can include components for charging the power source 164, such as the main body connector 112. Alternatively or in combination, the stylus 100 can include wireless charging capabilities for charging the power source 164. According to some embodiments, the stylus 100 can include components for converting mechanical energy into electrical energy. For example, the stylus 100 can include a piezoelectric device and/or a coil and magnetic components for generating electrical power upon mechanical movement thereof.

According to some embodiments, the stylus 100 can include a haptic device 178 for providing haptic feedback to a user. Use of the button 150 can be accompanied by haptic feedback to confirm receipt of a user input via the button 150. By further example, haptic feedback can be provided to confirm when the tip probe 190 detects contact with a surface.

According to some embodiments, the stylus 100 can include other components including, for example, orientation detectors, biometric readers, displays, sensors, switches (e.g., dome switches), buttons, speakers, microphones, cameras, voice coils, and/or other components.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless stylus comprising:
a tip probe for contacting an object;
a probe sensor for detecting contact by the tip probe;
an accelerometer for measuring acceleration data of the wireless stylus during motion of the tip probe from a first location to a second location;
an orientation sensor for measuring orientation data of the wireless stylus when the probe sensor detects contact by the tip probe with the second location or the first location; and
a controller programmed to:
calibrate a position, velocity, and acceleration of the wireless stylus with respect to a reference point based on a first user input indicating that the tip probe is at rest at the reference point;
initiate a sampling session based on a detection that the tip probe is contacting the first location, the sampling session comprising recording the acceleration data and the orientation data;
determine, based on the acceleration data, the orientation data, and a known distance between the accelerometer and the tip probe, a position of the second location with respect to the first location; and
recalibrate the position, velocity, and acceleration of the wireless stylus with respect to the reference point based on a second user input indicating that the tip probe is at rest at the reference point.

2. The wireless stylus of claim 1, further comprising a communication component configured to wirelessly communicate to an external device the acceleration data, the orientation data, the known distance, or the position of the second location with respect to the first location.

3. The wireless stylus of claim 1, further comprising a button, wherein, while the button is pressed, the accelerometer is programmed to measure the acceleration data and the orientation sensor is programmed to measure the orientation data.

4. The wireless stylus of claim 1, further comprising a button, wherein, while the button is pressed, the controller calibrates the first location, the acceleration data, or the orientation data of the wireless stylus with respect to a coordinate system.

5. A method of detecting a contour of an object, comprising:
calibrating a position, velocity, and acceleration of a wireless stylus with respect to a reference point based on a user input indicating that a tip probe of the wireless stylus is at rest at the reference point;
with a probe sensor of the wireless stylus, detecting contact by the tip probe with a first portion of the object;
while the tip probe is moved from the first portion to contact a second portion of the object, detecting with the probe sensor that the tip probe is not contacting the object and beginning a sampling session in which acceleration data and orientation data of the wireless stylus are recorded;
with the probe sensor of the wireless stylus, detecting contact by the tip probe with the second portion of the object and terminating the sampling session; and
based on the acceleration data, the orientation data, and a known distance between an accelerometer and the tip probe, identifying the contour of the object, the contour including the first portion and the second portion, by calculating locations of the tip probe corresponding to points in time when the tip probe is in contact with the object and not calculating the locations of the tip probe for points in time corresponding to when the tip probe is not in contact with the object.

6. The method of claim 5, wherein the recording is performed repeatedly while the tip probe is moved from the first portion to the second portion.

7. The method of claim 5, further comprising:
receiving an input at the wireless stylus while the wireless stylus is at rest; and
based on the input, calibrating the first portion, the acceleration data, or the orientation data of the wireless stylus with respect to a coordinate system.

8. The method of claim 5, wherein the wireless stylus is wireless and freely moved from the first portion to the second portion without a physical connection to an external device.

9. The method of claim 8, further comprising wirelessly communicating the acceleration data and the orientation data to the external device.

10. The method of claim 8, further comprising communicating the position of the second portion to the external device.

11. The method of claim 8, wherein the position of the second portion is determined independent of optical visualization of the wireless stylus with an imaging device.

12. The method of claim 5, wherein the contour excludes locations of the tip probe when the tip probe is not contacting the object.

13. The method of claim 5, wherein the tip probe comprises a force sensor.

14. A method of detecting a contour of an object, comprising:
detecting, with a probe sensor of a wireless stylus, when a tip probe of the wireless stylus is contacting the object;
based on a detection that the tip probe is contacting the object, recording acceleration data and orientation data of the wireless stylus;
detecting, with the probe sensor, when the tip probe is not contacting the object;
based on the acceleration data, the orientation data, and a known distance between an accelerometer and the tip probe, identifying the contour of the object, the contour including locations of the tip probe when the tip probe is contacting the object, by calculating locations of the tip probe corresponding to points in time when the tip probe is in contact with the object and not calculating the locations of the tip probe for points in time corresponding to when the tip probe is not in contact with the object; and
calibrate a position, velocity, and acceleration of the wireless stylus with respect to a reference point based on a user input indicating that the tip probe is at rest at the reference point.

15. The method of claim 14, wherein the contour excludes locations of the tip probe when the tip probe is not contacting the object.

16. The method of claim 14, wherein the wireless stylus is freely moved without a physical connection to an external device.

17. The method of claim 16, further comprising wirelessly communicating the acceleration data and the orientation data to the external device.

18. The method of claim 16, wherein the tip probe comprises a force sensor.

* * * * *